United States Patent [19]

Cook et al.

[11] 4,004,266

[45] Jan. 18, 1977

[54] TRANSDUCER ARRAY HAVING LOW CROSS-COUPLING

[75] Inventors: Rufus L. Cook; Lyles C. Adair, both of Panama City, Fla.

[73] Assignee: The United States of America as represented by the Secretary of the Navy, Washington, D.C.

[22] Filed: Dec. 5, 1975

[21] Appl. No.: 638,013

[52] U.S. Cl. .................................. 340/9; 340/12 R; 340/10

[51] Int. Cl.[2] .......................................... H04B 13/00

[58] Field of Search ............... 340/8 R, 9, 10, 12 R, 340/13; 310/8.7

[56] References Cited

UNITED STATES PATENTS

| | | | |
|---|---|---|---|
| 2,925,582 | 2/1960 | Mattei et al. | 340/9 |
| 3,212,056 | 10/1965 | Grieg | 340/9 |
| 3,376,438 | 4/1968 | Colbert | 340/10 |
| 3,396,286 | 8/1968 | Anderson et al. | 340/10 X |
| 3,427,481 | 2/1969 | Lenahan et al. | 340/10 X |
| 3,464,044 | 8/1969 | Strauss | 340/8 R |
| 3,513,439 | 5/1970 | Egli | 340/10 |
| 3,953,828 | 4/1976 | Cook | 340/10 X |

*Primary Examiner*—Harold Tudor
*Attorney, Agent, or Firm*—Richard S. Sciascia; Don D. Doty; Harvey A. David

[57] ABSTRACT

An array of circular, acoustic projecting and receiving transducers is described, including a stainless steel baffle plate in which the transducers are mounted, each comprising a stainless steel cup containing a disc-shaped piezoelectric element set in low impedance material and covered by a water impedance matching window. Capacitive and inductive tuning means is provided between each receiving transducer and its associated electronics.

4 Claims, 8 Drawing Figures

TRANSDUCER ARRAY HAVING LOW CROSS-COUPLING

STATEMENT OF GOVERNMENT INTEREST

The invention described herein may be manufactured and used by or for the Government of the United States of America for Governmental purposes without the payment of any royalties thereon or therefor.

FIELD OF THE INVENTION

This invention relates to electroacoustic transducer arrays for underwater use as sonar projectors and/or hydrophones. More particularly, the invention is directed to improved transducer array constructions that minimize cross-talk or cross-coupling between individual transmitting and receiving transducers which are positioned physically close to one another and operate at the same frequency or over a discrete frequency band. The invention is also directed to sonar array constructions that electrically effect improved tuning of transmission line and receiving transducer combinations within the array.

DISCUSSION OF THE PRIOR ART

Various approaches have been made in the past to reduce crosstalk or cross-coupling between individual transducers in an array. The desirability of such reduction has generally been based on the requirement of directional beamforming capabilities in shipboard active sonar systems of the pulse type such as are used in antisubmarine warfare, in target tracking torpedoes, and the like. More recently, with the increased use of FM (frequency modulated) and CW (continuous wave) systems, for example, as part of doppler navigation systems, the problems of cross-talk or cross-coupling between closely situated, simultaneously operating projecting and receiving transducers have become important.

One approach to reduction of cross-coupling between individual transmitting and receiving transducers has been to provide an impedance discontinuity therebetween. For instance, a block of "Corprene," or balsa, or the inclusion of a quarter-wavelength path of a solid such as steel would establish such a discontinuity.

Another approach has been to use a lead metaniobate piezoceramic material as the active transducer element. It is well known that this piezoceramic material generates only a low mechanical stress in a plane normal to the direction that the material was polarized. In other words, metaniobate elements produce little lateral or sidewise acoustic energy when energized, and are relatively insensitive to acoustic energy received in those directions.

Although each of the above expedients have been used in transducer design, no cross-coupling data thereon appears to be available. Tests were therefore made on a transducer array comprising lead metaniobate elements encapsulated in a polyurethane potting material, thereby embodying usual measures of reducing cross-coupling. The test results showed a cross-coupling level of -45 db between the array results showed a cross-coupling level of -45 db between the array transducer elements. Needless to say, such cross-coupling between adjacent transmitting and receiving transducers of a CW or FM sonar system could severely inhibit the performance thereof. Moreover, from an operational standpoint, it is desirable that the cross-coupling level be below the reverberation and thermal noise limits of the system. Also, the electroacoustic efficiency of the lead metaniobate element was determined to be approximately 10 percent.

SUMMARY OF THE INVENTION

The present invention aims, through novel constructions, combinations, and arrangements of parts, to overcome the presently limiting levels of cross-coupling and electroacoustic efficiency in a sonar array wherein transmitting and receiving electroacoustic transducers are in close proximity to one another, thereby rendering the array more suitable to efficient and satisfactory use in those mentioned systems wherein cross-coupling is particularly objectionable.

With the foregoing in mind, it is a principal object of the invention to provide a sonar array having cross-coupling levels that represent improvement of an order of magnitude over the available constructions.

Another object of the invention is the provision of an improved sonar array that is particularly rugged in construction, capable of deep submergence use, and yet wherein the individual transducers are readily removed and replaced.

Still another object is the provision of a sonar array of the foregoing character wherein the receiving transducer's efficiency and bandwidth characteristics are improved by electrical tuning of each receiver transducer and signal transmission line with the associated electronics.

Yet another object is to provide a multiple transducer array comprising a baffle plate, formed for example of stainless steel, having recesses formed therein in which are received the individual transducers, the latter being received with a sliding fit, and provided with an elastomeric O-ring seal between each transducer and the baffle plate.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
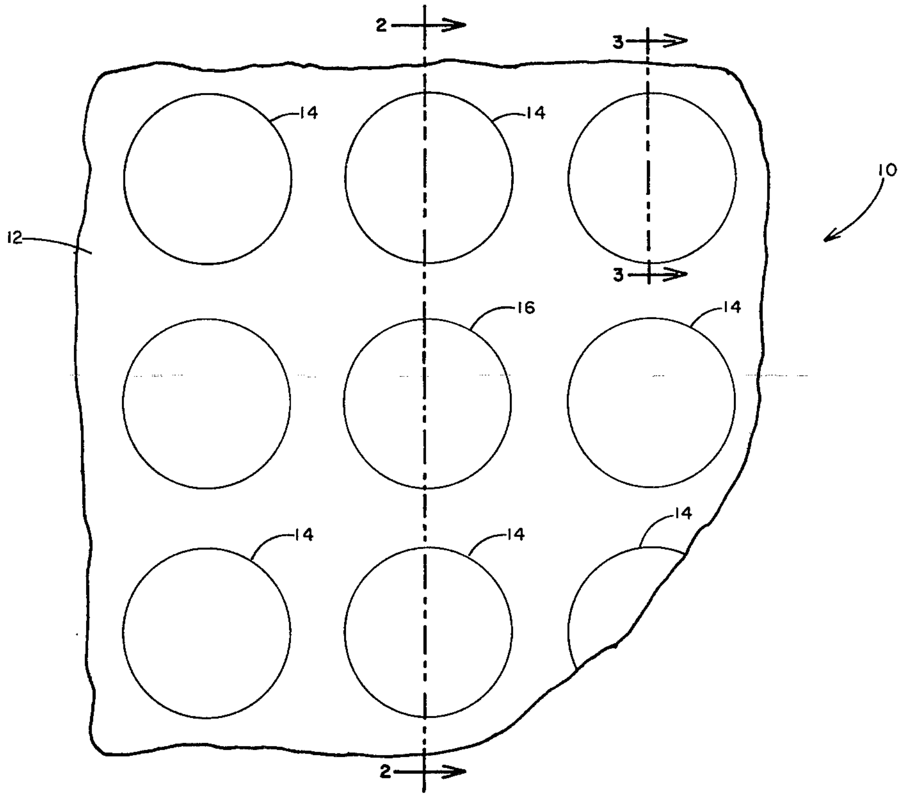
FIG. 1 is a fragmentary elevational view of a sonar array embodying the invention.

Referring to FIG. 1, a fragmentary portion of a planar transmitting and receiving sonar array is generally indicated at 10 and comprises a baffle plate 12 in which are mounted a plurality of circular faced electroacoustic transducers 14 and 16. For purposes of illustration, the array 10 will be described as intended for operation in the MHz region, say for peak performance at 1200 kHz. Transducers 14 are, in the array 10 being described, used as acoustic energy transmitters whereas the transducers 16 are used as acoustic energy receivers. Otherwise, transducers 14 and 16 are identical in structure, which structure will later be described in detail with reference to FIG. 3.

Figure 2:
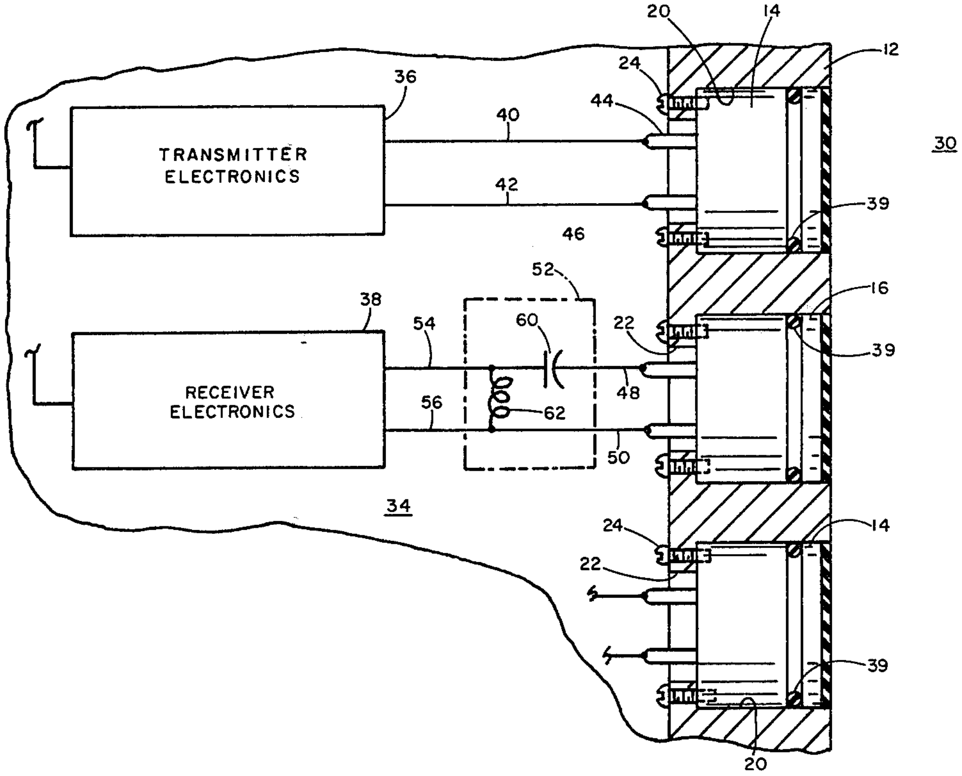
FIG. 2 is a sectional view taken substantially along line 2—2 of FIG. 1.

Referring additionally to FIG. 2, baffle plate 12 is preferably formed of stainless steel, or other suitable metal. It has been found by testing, however, that stainless steel is a preferred material for the baffle in regards to the minimizing of cross-coupling between transducers 14 and 16. Plate 12 is bored to provide a plurality of cylindrical recesses 20 and flanges 22, in which recesses the respective transducers 14 and 16 are received. The transducers are conveniently secured in plate 12 as by screws 24 extending through the flanges 22.

The front surface 28 of plate 12 is presented to the water medium 30 through which acoustic energy is transmitted and received by array 10, while the rear surface 32 of the plate is presented to a cavity 34. Cavity 34 typically contains lead wires, often in the form of coaxial cables, of which only the conductors are schematically illustrated herein, and various electronic elements such as those indicated in block form at 36 transmitter electronics and at 38 as receiver electronics. These electronic elements will vary depending upon the application to which the array is put, and their construction and operation is well known in the art to which the invention pertains. Suffice it to say that they may include such circuits as transducer driving power amplifiers, receiving preamplifiers, and the like. Each transducer 14,16 is provided with an elastomeric O-ring 39 which effects an annular seal between the respective transducer and plate 12, whereby the cavity 34 is isolated from medium 30.

Transducers 14 are connected to their respective transmitter electronics 36 as by conductors 40, 42 leading from terminals 44, 46. Transducers 16 are connected to their respective receiver electronics via conductors 48, 50, a tuning network 52, and conductors 54,56. Conductors 40,42; 48,50; and 54,56 are generally in the form of coaxial cables, and as such are characterized by inductance and/or capacitive effects which can affect system performance.

Tuning network 52 comprises a capacitor 60 connected in series between one terminal of transducers 16 and the associated electronics, and an inductor 62 connected in parallel with the electronics on the electronics side of the capacitor. The circuit 52 comprises a capacitive input LC device which, through proper selection of values, results in peak performance of the transducer at a desired frequency and circumvents the limitation of μh inductors in the MHz region of operation. What is unusual in this arrangement is that the capacitor 60 tunes the cable inductance while inductor 62 tunes the conjugate reactance of the capacitor, cable, transducer combination. In the present example, wherein peak performance of the receiving transducers 16 is desired at 1200 KHz, capacitor 60 has a value of 3600 pf and inductor 62 has a value of 5.5 μh.

Figure 3:
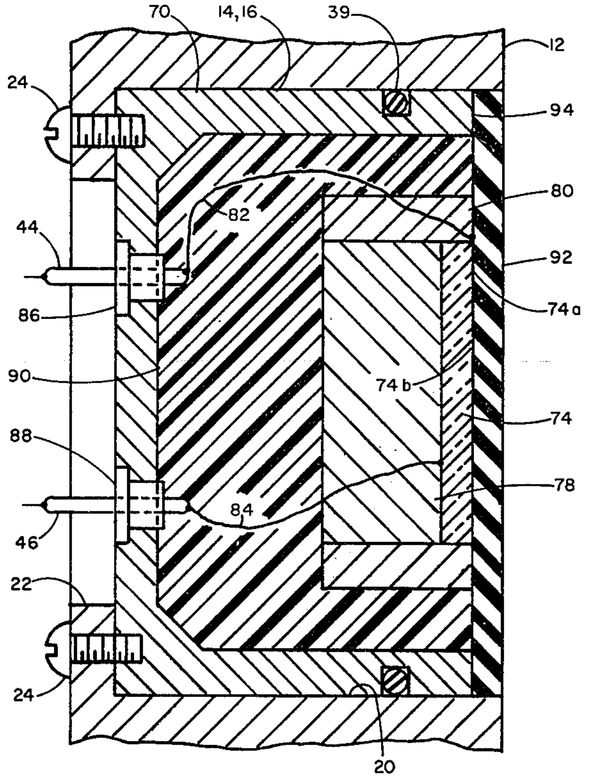
FIG. 3 is an enlarged sectional view taken substantially along line 3—3 of FIG. 1.

Referring now to FIG. 3, the construction of an individual transducer 14 will be described. Inasmuch as transducers 14 and 16 are identical, the description will be understood to be equally applicable to each.

Transducer 14 comprises a stainless steel cup or cup-shaped housing 70 having cylindrical side wall sized to fit nicely into opening 20 of plate 12. The active portion of transducer 14 comprises a disc shaped piezoelectric ceramic element 74 formed, in this example, of lead zirconate piezoceramic. Element 74 preferably has a thickness of on the order of one-half wavelength of the principal operating frequency. The surfaces 74*a*, 74*b* of piezoceramic element 74 are plated or coated with a conductive layer of silver, or other well known electrode forming means for applying an electrical potential to, or receiving it from, the opposite surfaces of the element. The element 74 is polarized in the usual manner to effect changes in thickness thereof with changes in electrical potential applied to the electrodes, or to generate electrical potentials in response to pressures applied to the element. As is known, increases in thickness are accompanied by decreases in diameter of the element, and vice-versa.

Element 74 is backed by a disc 78 of a low impedance material such as Corprene, or a combination of cork and neoprene. Disc 78 is cemented to the electrode coated surface 74*b*, as by a suitable glue or adhesive. Surrounding and cemented to the element 74 and the disc 78, which are congruent, is an annulus or cylinder 80 of low impedance material, conveniently of the same material as disc 78.

A pair of wire conductors 82, 84 lead from the electrode coated surfaces 74*a*, 74*b* of element 74 to the inner ends of terminals 44, 46, respectively. The terminals extend through and are conveniently fixed in the bottom wall of stainless steel cup 70 by means of electrical insulators 84,88. The remainder of cup 70 is filled with a rigid, low acoustic impedance potting compound 90, such as a polyurethane plastic. The potting compound and stainless steel cup 70 comprise a resonant decoupler system that inhibits inter-wave transmission.

An acoustic window 92, comprising a circular layer of a material such as ABS (Acrylonitrile-butadiene-styrene) or "Rho-C" rubber having a good impedance match with water, is secured in overlying relation to the rim of cup 70, to the acoustically reflecting material 80, and to the upper electrode surface 74*a* of piezoceramic element 74. The acoustic window 92 is preferably one-half wave length in thickness and is secured at 94 to the rim surface of the stainless steel cup 70 by a rigid epoxy cement. As can be seen from FIGS. 2 and 3, the transducers are received in their respective recesses in the baffle plate 12 so that the exposed acoustic window portion 92 of each transducer is substantially flush with the baffle plate surface 28.

Figure 4:
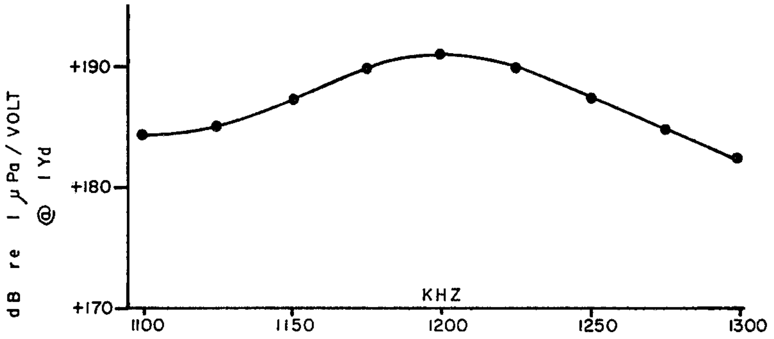
FIG. 4 is a graphic illustration of transmitting response of a transducer of the array of FIG. 1.

Referring to FIG. 4, the transmitting response of a typical transducer 14 is shown for the frequency range of 1100 kHz to 1300 kHz. The peak acoustic output for the transducer occurs at 1200 kHz for a reference input of 1 volt rms.

Figure 5:
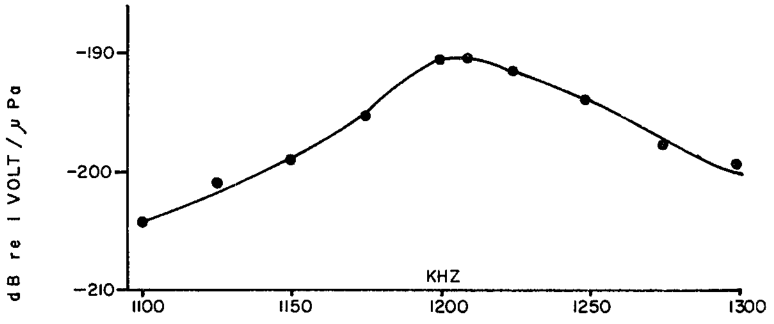
FIG. 5 is a graphic illustration of receiving response of the transducer.

The receiving response of a typical transducer 16, the construction of which it will be recalled is identical to that of transducer 14, is shown in FIG. 5 for the frequency range of 1100 kHz to 1300 kHz. The maximum voltage output, referenced to μPa pressure, occurs at 1200 kHz.

Figure 6:
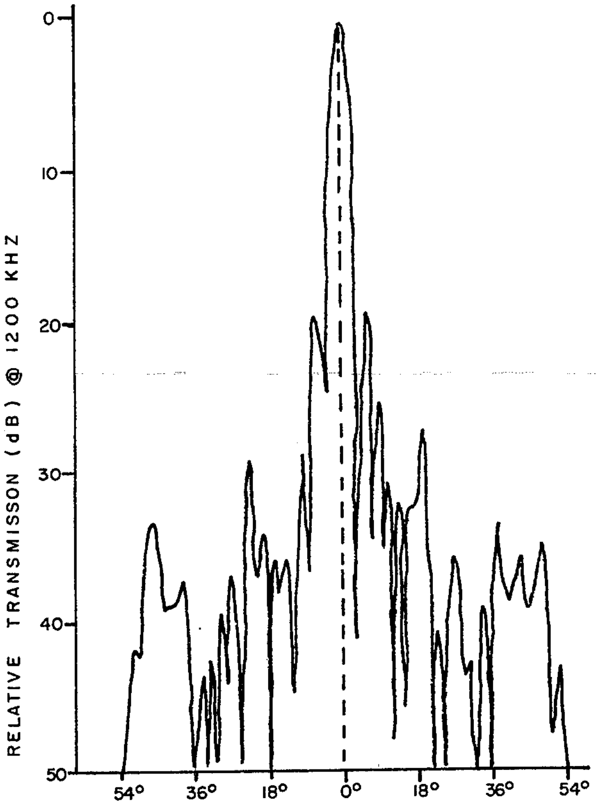
FIG. 6 is a graphic illustration of radiation or receiving directivity of a typical transducer.

FIG. 6 illustrates the radiation characteristics or receiving directivity of a typical transducer 14,16 at the frequency of 1200 kHz. Here it can be observed that no significant radiation occurs beyond ± 52°.

In the present example, the transducers 14,16 have an overall diameter of 1.5 inches and are spaced in their respective rows, on 1.574 inch centers so that the minimum spacing between adjacent transducers 14 and 16 is on the order of 31 wavelengths.

Qualitative tests of the array 10, immersed in an aqueous medium, have shown that the array is characterized by a cross-coupling level of −75 db from transmitting transducer 14 to adjacent receiving transducer 16, with transducer 14 driven with a 10 volt (peak-to-peak) CW signal. It has also been determined that when transducer 14 is electrically pulsed the cross-coupling level decreases to −81 db, and that the cross-coupling level can be further reduced to as low as −91 db by increasing the spacing between transmitting and receiving transducers. Comparison tests between aluminum, as the baffle plate material, and stainless steel, shows that the stainless steel provides 10 db less cross-coupling than aluminum.

Figure 8:
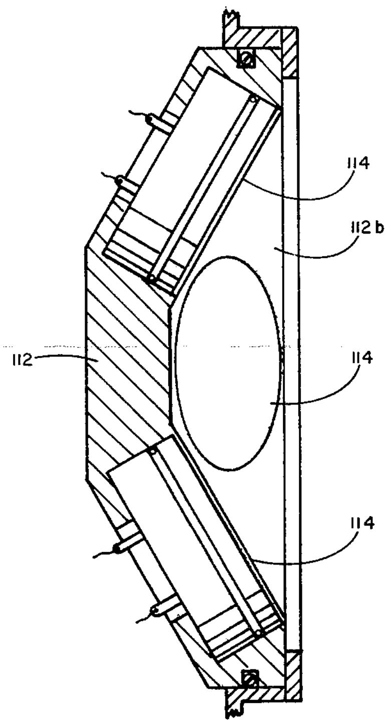
FIG. 8 is a sectional view taken substantially along line 8—8 of FIG. 7.
Figure 7:
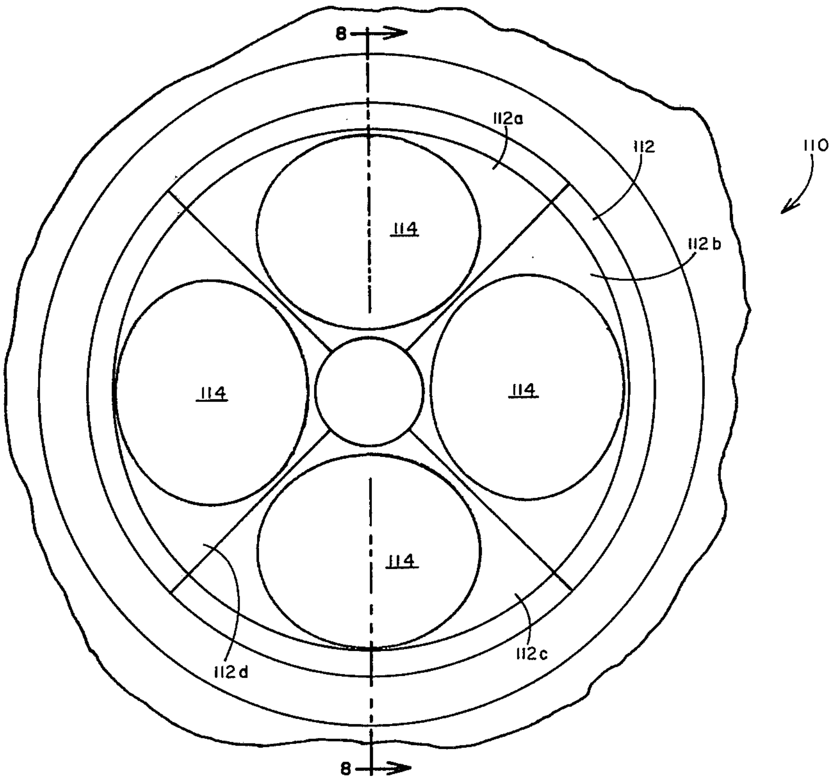
FIG. 7 is an elevational view of a different array embodying the invention.

Referring now to FIGS. 7 and 8, the invention is embodied in an array 110 comprising a baffle plate 112 of stainless steel, but which comprises a plurality of plane portions 112*a*, 112*b*, 112*c*, and 112*d* that are angularly disposed relative to one another. Array 110 has particular application in a doppler navigation sonar system and comprises four angularly disposed transmitting transducers 114 set into the baffle plate 112. A second array (not shown), identical in construction to array 110, is used as an array of receiving transducers. In receiving transducers are operated in corresponding transmitting transducer 114 of array 110 is paired with the forward looking transducer of the receiving array, the port looking transmitting transducer 114 of array 110 is paired with the port looking transducer of the receiving array, etc. Because of the acoustic response pattern of FIG. 6, it will be appreciated that the transmitting transducers do not project appreciable energy directly to the receiving transducer of either pair, and because of the low level of cross-coupling resulting from the transducer and baffle plate constructions discussed above, the array 110 is well suited to CW use. Also, the array shown in FIG. 7 could be electrically switched between transmission and reception modes of operation, thereby eliminating the need for the second identical array.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A sonar array suitable for simultaneous transmission and reception of acoustic energy of a predetermined wavelength into and from an aqueous medium, said array including a rigid metal baffle plate having a plurality of recesses therein arranged in a predetermined pattern and a plurality of electroacoustic transducers, each received in a corresponding one of said recesses and presenting a surface substantially flush with said plate, said array being characterized by the improvement wherein each of said transducers comprises:

a rigid metal cup-shaped body having a rim surface;

a disc-shaped piezoelectric element that is substantially one-half of said wavelength in thickness and comprises electrode means on opposite faces thereof, one of said faces being directed inwardly of said cup-shaped body and the other of said faces being directed outwardly thereof;

a substantially congruent disc of a first low acoustic impedance material cemented to the electrode means on said one of said faces of said piezoelectric element;

a cylinder of said first low acoustic impedance material surrounding and cemented to the periphery of said piezoelectric element and said congruent disc of first low acoustic impedance material;

a potting compound of a second low acoustic impedance material disposed in said cup-shaped body and surrounding said disc and cylinder in supporting relation thereto and to the piezoelectric element therein; and an acoustic window comprising a circular layer of material having an acoustic impedance substantially matching that of water, said window being secured in overlying relation to said outwardly directed face of said piezoelectric element, to said cylinder of first low acoustic impedance material, to said second low acoustic impedance material potting compound, and to said rim surface of said cup-shaped body;

whereby the periphery and said inwardly directed face of said piezoelectric element are separated from said cup-shaped body by both of said first and second low acoustic impedance materials and adjacent ones of said transducers in said array are characterized by cross-coupling of less than about −75 db.

2. A sonar array as defined in claim 1, and wherein: said baffle plate is formed of stainless steel.

3. A sonar array as defined in claim 2, and wherein said cup-shaped body is formed of stainless steel.

4. A sonar array as defined in claim 3, and further comprising:

sealing means, disposed between said cup-shaped body and said baffle plate, for preventing passage of said aqueous medium from said one side of said baffle plate to the other side thereof.

* * * * *